UNITED STATES PATENT OFFICE.

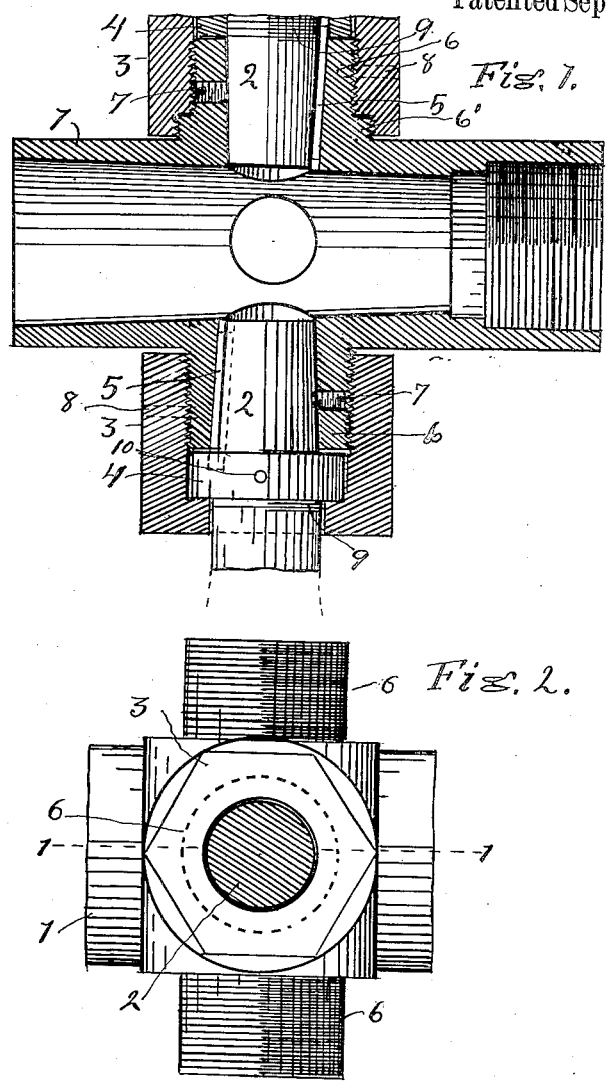
J. INGELLS.
AEROPLANE TRACTOR.
APPLICATION FILED MAY 3, 1919.
1,353,961.
Patented Sept. 28, 1920.
Inventor
James Ingells

JAMES INGELLS, OF MUSKEGON, MICHIGAN.

AEROPLANE-TRACTOR.

1,353,961.  Specification of Letters Patent.  Patented Sept. 28, 1920.

Application filed May 3, 1919. Serial No. 294,583.

*To all whom it may concern:*

Be it known that I, JAMES INGELLS, a citizen of the United States, residing at Muskegon, in the county of Muskegon and State of Michigan, have invented certain new and useful Improvements in Aeroplane-Tractors, of which the following is a specification.

My invention relates to the manner of securing metal aeroplane tractor and propeller blades into a metallic hub, and its objects are: first, to provide a means whereby the blades may be made to connect with the hub in an absolutely rigid and dependable manner; second, to provide a means whereby the blades will be held securely against any possibility of turning in its bearing; third, to provide a means whereby a nut or bur may be placed upon the bearing end of the blade back of a collar in such a manner that the blade bearing may be drawn securely into the bearings in the hub, and, fourth, to provide a means whereby the nut or bur will be held safely against the danger of becoming loose upon its bearings.

I attain these objects by the mechanism, construction and assembling of parts shown in the accompanying drawing, in which Figure 1 is a longitudinal section of the hub on the line 1—1 of Fig. 2, and Fig. 2 is a plan of a short piece of the hub with the nuts off of two of the bearings and with a piece of the blade shown in section in the hub.

Similar reference numerals indicate similar parts through the several views.

In the accompanying drawing 1 represents the hub proper, the two ends of which are shown as cut off in Fig. 2. 2 represents one end of the blade that is secured into the hub arms 6. This end of the blade must be made to exactly fit into the bearings in the arms 6, and to secure them rigidly in place I form screw threads 9 upon, or into the surface of the bearing and force a nut or collar 4 upon this screw-threaded bearing, first having passed the jam nut 3 upon the bearing end of the blade, so that when this end of the blade is passed into its bearing the nut 3 may be screwed upon the arm 6 and, drawing heavily upon the collar 4, will draw the end of the blade firmly into place and will clamp said collar firmly between the end of the arm 6 and the collar on the jam nut.

To avert any possible danger of the blades being made to revolve or twist in their bearings in the arms 6, I place a key, as 5 into the arm and bearing 2 in such a manner that the blade must remain, at all times, in its normal position, and, for the purpose of averting the danger of the collar 4 being made to revolve upon its bearing when securing the nut 3 onto, or off of the arm, I sometimes pass the end of this key into the collar, as indicated in Fig. 1, or a pin may be inserted, as indicated at 10, the collar being applied simply for the purpose of forming a bearing for the nut 3, as hereinbefore intimated.

I sometimes apply a screw pin, as 7, to assist in properly retaining the bearing end of the blade and impressing it against the key 5, and to insure the permanent location of the nut 3 upon the arm 6 I sometimes place pins, as indicated by the dotted lines 8 in Fig. 1. I, generally, prefer the plain arm shown in Fig. 2, but find that by forming a shoulder, as 6', upon the arm the strength and utility of the connection of the nut with the arm are greatly increased.

What I claim as new in the art, is:

1. In an aeroplane tractor, a steel hub for use upon an aeroplane motor shaft, cylindrical arms radiating from said hub and screw threaded upon their outer peripheries, tractor blades fitted at the hub end to closely fit within the arms, a collar removably mounted near the hub end of each blade and adapted to withstand extreme pressure longitudinally of the blade, and a joint nut fitted to screw upon each arm and engage the collars and hold the blades firmly in place.

2. In combination with the elements covered in claim 1, a shoulder formed around the base of each arm, concentric therewith, and the end of the joint nut fitted to closely encircle and engage said shoulder.

3. In combination with the elements covered in claim 1, the arms, the hub ends of the blades, and the collar having coöperative key ways therein, and a key embedded in each of said key ways and extending into the collar.

4. In an aeroplane tractor, a metal hub, cylindrical arms radiating from the sides of said hub and screw threaded on the outer periphery, a shoulder formed around the base of each arm, concentric therewith, a joint nut fitted to be screwed firmly upon each arm encircling the shoulder at the base of each, tractor blades fitted at the hub ends to closely fit within the hollows of the arms, a collar removably mounted upon each blade to withstand extreme pressure longitudinally of the blades, the inner periphery of the arms, the outer periphery of the hub ends of the blades, and one side of the collar having coöperative key seats therein, a key mounted in each of said arms to engage the key seats in the arms and to extend into the key seats in the collars, and a set screw through one side of each arm for regulating the position of the hub ends of the blades in the arms.

5. In combination with the elements covered in claim 1, a set screw through one side of each arm and acting upon the hub end of each blade, and a key seated in the arm and the hub end of the blade with one end extending well into the collar of each blade.

Signed at Grand Rapids, Michigan, April 30, 1919.

JAMES INGELLS.